(12) United States Patent
Hammadou

(10) Patent No.: US 6,937,274 B2
(45) Date of Patent: Aug. 30, 2005

(54) DYNAMIC RANGE COMPRESSION OF OUTPUT CHANNEL DATA OF AN IMAGE SENSOR

(75) Inventor: Tarik Hammadou, Kingsford (AU)

(73) Assignee: Motorola, Inc., Schaumburg, IL (US)

( * ) Notice: Subject to any disclaimer, the term of this patent is extended or adjusted under 35 U.S.C. 154(b) by 793 days.

(21) Appl. No.: 10/024,824

(22) Filed: Dec. 17, 2001

(65) Prior Publication Data

US 2003/0113013 A1 Jun. 19, 2003

(51) Int. Cl.[7] .............................................. H04N 5/228
(52) U.S. Cl. ...................... 348/222.1; 348/242; 382/279
(58) Field of Search .......................... 348/222.1, 223.1, 348/225.1, 251, 242, 252, 253, 254, 256, 263; 358/518; 382/274, 275, 279, 166, 260

(56) References Cited

U.S. PATENT DOCUMENTS

| | | | | |
|---|---|---|---|---|
| 5,901,242 A | * | 5/1999 | Crane et al. ................. | 382/166 |
| 2003/0072496 A1 | * | 4/2003 | Woodell et al. ............. | 382/260 |
| 2003/0122937 A1 | * | 7/2003 | Guarnera et al. ........ | 348/222.1 |
| 2003/0193584 A1 | * | 10/2003 | Malkin et al. ........... | 348/222.1 |
| 2004/0051799 A1 | * | 3/2004 | Yamanaka ............... | 348/222.1 |
| 2004/0131273 A1 | * | 7/2004 | Johnson et al. ............ | 382/275 |
| 2004/0268096 A1 | * | 12/2004 | Master et al. ............ | 348/222.1 |
| 2005/0025380 A1 | * | 2/2005 | Keshet et al. ............... | 382/260 |

OTHER PUBLICATIONS

"A Current Mode Implementation of Shunting Inhibition" from 1997 IEEE International Symposium on Circuits and Systems, Jun. 9–12, 1997, Hong Kong, pp. 557–560.

"Shunting Inhibitory Cellular Neural Networks: Derivation and Stability Analysis" from IEEE Transaction On Circuits And Systems—I: Fundamental Theory And Applications, vol. 40, No. 3, Mar. 1993, pp. 215–221.

"Digital Signal Processor With Efficient RGB Interpolation And Histogram Accumulation" from IEEE Transactions on Consumer Electronics, vol. 44, No. 4, Nov. 1998, pp. 1389–1395.

"Adaptive Gamma Processing Of The Video Cameras For The Expansion Of The Dynamic Range" from IEEE Transactions on Consumer Electronics, vol. 41, No. 3, Aug. 1995, pp. 555–562.

\* cited by examiner

Primary Examiner—Aung Moe

(57) ABSTRACT

A method (S100) for dynamic range compression of output channel data from an image sensor (2) comprising an array of sensor cells. The method (S100) comprises selecting a window (S130) in the channel data, the window having a reference pixel value and a plurality of nearby pixel values. The reference pixel value originates from a reference cell that is one of the sensor cells and the nearby pixel values originate from the sensor cells that are in close proximity to the reference cell. There is a step of multiplying (S140) the pixel values, in the window, by a respective weight value to provide weighted pixel values and then adding (S150) the weighted pixel values to provide a convolution value. Thereafter, there is a step of providing (S160) a dynamic range compression value for the window from a selected one of the pixel values and said convolution value and then an assigning step (S170) assigns the dynamic range compression value to a selected pixel location comprising part of an image.

15 Claims, 4 Drawing Sheets

US 6,937,274 B2

DYNAMIC RANGE COMPRESSION OF OUTPUT CHANNEL DATA OF AN IMAGE SENSOR

FIELD OF THE INVENTION

This invention relates to dynamic range compression of output channel data of an image sensor. This invention is particularly useful for, but not limited to, dynamic range compression of channel data representing colors generated by solid-state image sensors such as Complementary Metal Oxide Semiconductor (CMOS) image sensors that are particularly prone to generating noise.

BACKGROUND ART

Various types of solid-state image sensors are in use today, including charge-coupled device (CCD) image sensors and complimentary metal-oxide semiconductor CMOS image sensors.

CMOS image sensors typically utilize an array of active pixel image sensors and a row of register of correlated double-sampling (CDS) circuits or amplifiers to sample and hold the output of a given row of pixel image sensors of the array. Each active pixel image sensor of the array of pixels typically contains a pixel amplifying device (usually a source follower).

Current CMOS image sensors have inferior image performance compared to CCD image sensors. This inferior image performance is due to inherent Fixed Pattern Noise (FPN), limited dynamic range (about 72 dB) which is reduced, in part, by FPN, and low fill factor (the ration of photo-detector areas to total of the APS pixel circuitry) which results in lower sensitivity. A digital image processor is therefore necessary in order to improve the image quality of CMOS image sensors.

Several image enhancement algorithms have been developed for digital cameras that use solid state image sensors. However, because these algorithms are developed and optimized for CCDs, they do not achieve the same image enhancement for cameras using CMOS image sensors.

A major goal of image enhancement is to process an original image in a manner such the processed image is more suitable for a desired application. Image details that are blurred or corrupted are enhanced by removal of perceived noise from the image. However, by merely removing perceived noise often leads to removal of important image information along with noise.

Most of the image enhancement techniques operate on a color interpolated version of the image. The color interpolated version is generated from a brayer pattern. Each pixel location of the image sensor has the intensity level of only one of three color components Red, Green or Blue that are used to provide respective R, G, B output channels. The brayer pattern is then color interpolated such that each pixel's, missing color components are approximated to give each missing color. However, color interpolation inherently introduces noise into the image. A major requirement of image enhancement is therefore to accurately distinguish between true image details and false image details such as noise.

There are many image enhancement algorithms that include a function to expand the dynamic range of the image. An attractive way is described in Hansoo Kim & al., "Digital Signal Processor with Efficient RGB Interpolan and Histogram Accumulation", *IEEE Trans. On Consumer Electronics,* vol 44, No.4, November 1998 pp 1389–1395. In this paper, a processor controls a gamma slope to extract a set of feature data from an output image. The processor calculates then the numbers of pixels of luminance values in the bright range, in the middle range and in the dark range. Another method presented in "Adaptive Gamma Processing of the video Cameras for the expansion of the dynamic range", IEEE Trans. on Consumer Electronics vol. 41, No. 3, August 1995, pp 555–562 makes a histogram of the luminance level in a frame and expands the dynamic range by controlling the slopes of knee compensation.

Unfortunately, prior art dynamic range compression methods do not process pixel values to suit the behaviour of the human vision in which lines and edges are generally of importance. Prior art dynamic range compression methods do not ideally compensate for changing frequency characteristics with mean luminance which can be important because the nature of the noise present in the image changes significantly with mean luminance. At low values of mean luminance there is a significant proportion of high frequency noise caused by random photon events. At higher mean luminance values the signal to noise ration improves as the proportion of random photon events decreases, making detection of high frequency component far less error prone. Hence it would be useful for a dynamic range compression method to adopt the strategy of changing from object detectors at low light levels to feature detectors in bright light. This is due to the change in frequency characteristics in visual cells in the retina which act as low pass filters at low light levels and become bandpass filters as light intensity increases.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for dynamic range compression of output channel data from an image sensor comprising an array of sensor cells, the method comprising the steps of:

selecting a window in the channel data, the window having a reference pixel value and a plurality of nearby pixel values, said reference pixel value originating from a reference cell that is one of the sensor cells and said nearby pixel values originating from said sensor cells that are in close proximity to said reference cell;

multiplying said pixel values in the window by a respective weight value to provide weighted pixel values;

adding said weighted pixel values to provide a convolution value;

providing a dynamic range compression value for said window from a selected one of said pixel values and said convolution value; and assigning the dynamic range compression value to a selected pixel location comprising part of an image.

Preferably, the step of providing may be effected by dividing the said selected one of said pixel values by the convolution value to provide said dynamic range compression value. Preferably, said selected one of said pixel values may be said reference pixel value.

Suitably, the widow may correspond only to a chrominance channel.

Preferably, the above steps may be repeated for other windows in said channel.

Suitably, the above steps could be repeated so that the step of assigning thereby assigns a said dynamic range compression value to every pixel location providing a luminance color spectrum for said image The reference cell may be suitably a centrally located sensor cell in an array of said sensor cells providing said nearby pixel values.

Preferably, said step of multiplying may be further characterised by the respective weight value having the effect of Gaussian filtering. The step of multiplying may be further characterised by all said pixel vales in the window being multiplied by a said respective weight value.

Suitably, said dividing may have the effect of non-linear filtering said pixels values in said window.

Preferably, the steps of adding, providing and assigning can be effected by:

$$\frac{i_{ref}}{A + W \otimes I}$$

where $i_{ref}$ is the reference pixel value; I is a matrix representing the pixel values in the window for the luminance channel; W is a weight matrix representing strengths of connections for a corresponding sensor cell in the matrix I; and A is matrix containing decay values of the corresponding cell in matrix I; and $\otimes$ is a convolution function.

According to another aspect of the invention there is provided a digital camera comprising:

an image sensor comprising an array of sensor cells; and a Channel processing circuit coupled to receive channel output data from the image sensor, wherein in use the Channel processing circuit selects a window in the channel data, the window having a reference pixel value and a plurality of nearby pixel values, said reference pixel value originating from a reference cell that is one of the sensor cells and said nearby pixel values originating from said sensor cells that are in close proximity to said reference cell;

and thereafter assigns a dynamic range compression value to a selected pixel location comprising part of an image, the dynamic range compression value determined from the steps of:

multiplying said pixel values in the window by a respective weight value to provide weighted pixel values;

adding said weighted pixel values to provide a convolution value; and dividing a selected one of said pixel values by said convolution value.

The camera may be further characterised by one or more of the above method features or steps.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
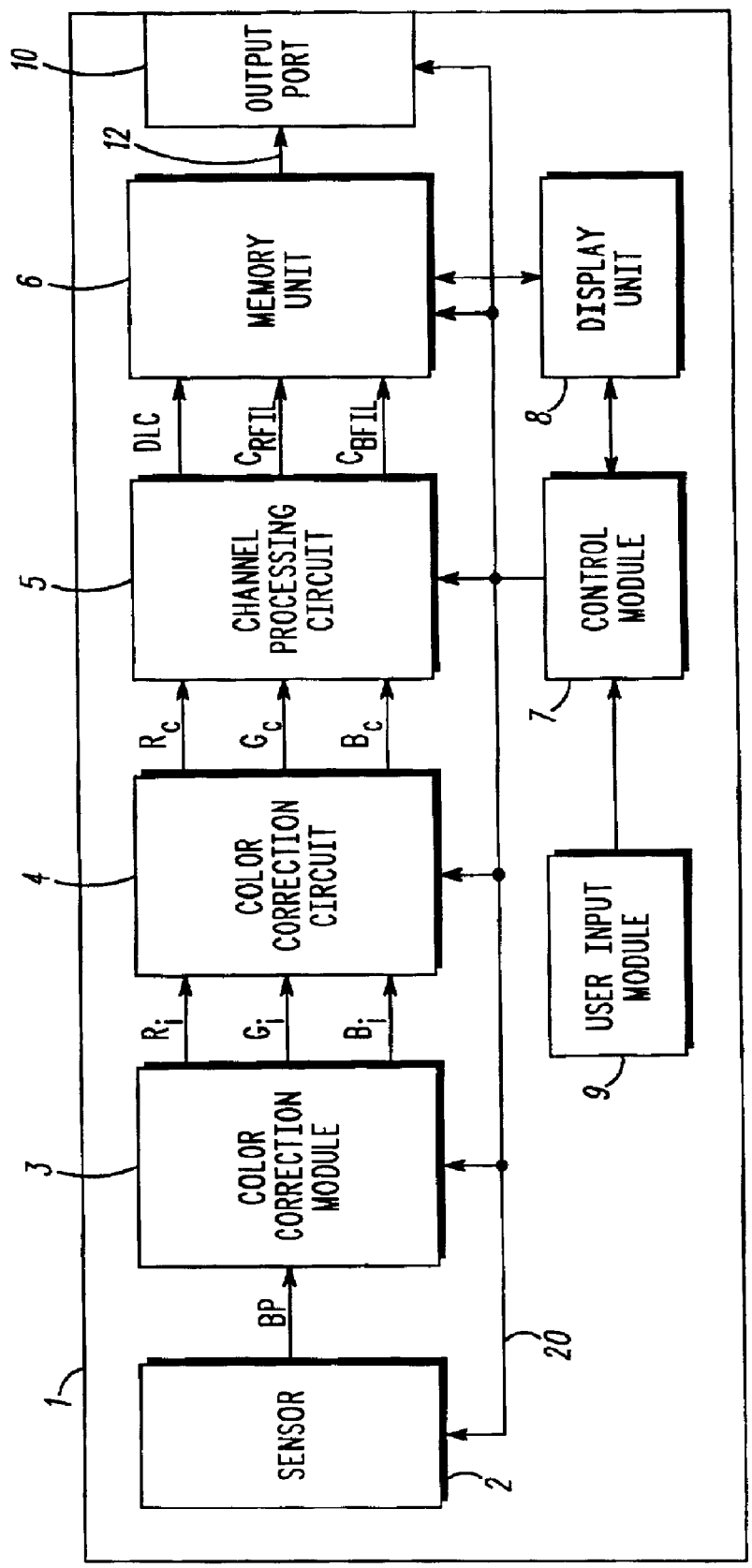
FIG. 1 is a block diagram of a camera in accordance with the present invention.

With reference to FIG. 1 there is illustrated a block diagram of a digital camera 1. Camera 1 includes an image sensor 2, typically a CMOS image sensor, having a Bayer pattern output or raw image output coupled to an interpolation module 3. As will apparent to a person skilled in the art, the image sensor 2 comprises an array of sensor cells that are arranged to be sensitive to a selected one of the primary colors (red, green and blue). The color interpolation module 3 has three channel outputs these being a Red interpolated output Ri, a Blue interpolated channel output Bi and a Green interpolated channel output Gi. The three channel outputs Ri, Bi and Bi are coupled to, and provide interpolated color output channel data to, respective inputs of a color correction circuit 4. Outputs of the color correction circuit 4 are a Red corrected channel output Rc, a Green corrected channel output Gc and Blue corrected channel output Bc. Further, the outputs of the color correction circuit 4 are coupled to, and provide corrected color output channel data to, respective inputs of a channel processing circuit 5.

Outputs of the channel processing circuit 5 are a Dynamic Luminance Compressed DLC channel output and color space converted and filtered red and blue Outputs $C_{RFIL}$, $C_{BFIL}$, these outputs of circuit 5 are coupled to inputs of a memory unit 6.

There is also a control module 7 coupled to a display unit 8 in the form of a Liquid Crystal Display for displaying displaying an image comprising processed color sampled signals provided at the outputs of circuit 5 and stored in the memory unit 6.

The camera 1 also includes a user input module 9 coupled to provide command signals to the control module 7. There is also an output port 10 coupled by a common bus 20 to the control module 7 and the memory unit 6 is coupled to the output port 10 by a bus 12. Further, the sensor 2, color interpolation module 3, color correction circuit 4, channel processing circuit 5 and memory unit 6 are coupled to the control module by the common bus 20.

Figure 2:
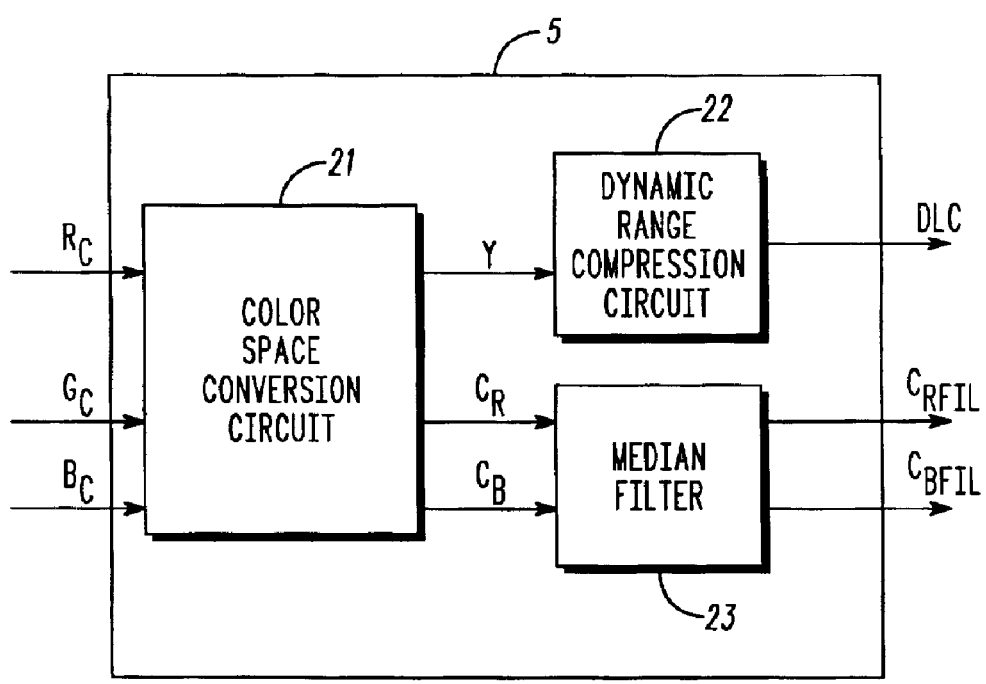
FIG. 2 illustrates a schematic block diagram of a channel processing circuit 5 that is part of the camera of FIG. 1.

Referring to FIG. 2, there is illustrated a schematic block diagram of the channel processing circuit 5. The channel processing circuit 5 includes a color space conversion circuit 21 with inputs coupled to the Red corrected channel output Rc, the Green corrected channel output Gc and the Blue corrected channel output Bc. In use, data on each channel output Rc,Gc,Bc is converted by circuit 21 into luminance and chrominance output channel data (defined by international standards) provided at a respective luminance channel Y and chrominance channels $C_R$, $C_B$.

The luminance channel Y is coupled to an input of a dynamic range compression circuit 22 and the chrominance channels $C_R$, $C_B$ are coupled to inputs of a median filter 23. The median filter is a non-linear filter that replaces each grey level pixel value, associated with one of the sensor cells, in one of the chrominance channels with a corresponding median value. For each replaced grey level pixel value, the median value is obtained by calculating the median grey levels of nearby pixel values corresponding to the sensor cells that are in close proximity to the sensor cell associated with the replaced grey level pixel value.

An output from the dynamic range compression circuit provides the Dynamic Luminance Compressed DLC channel output and outputs from the median filter provide the color space converted and filtered red and blue outputs $C_{RFIL}$, $C_{BFIL}$.

In this embodiment the dynamic range compression circuit 22 basically includes a processor and associated memory and therefore dynamic range compression is implemented in firmware. The firmware is based on a Cellular Neural Network CNN structure. Neural Networks as well known in the art and comprise a two dimensional array of mainly identical cells that satisfy two properties, these being: (a) that most interactions are local; and (b) that all state variables are continuous valued signals. Further details of Neural Networks are described in L. O. Chua, L. Yang, "Cellular Neural Networks: Theory", IEEE Trans. on Circuits and Systems, vol. 35, pp. 1257–1272, October 1988. This article is incorporated into this specification by reference.

In use, images stored in the memory unit that are supplied from the output channels DLC, $C_{RFIL}$ and $C_{BFIL}$ are displayed upon the display unit 8 in response to suitable commands provided from the user input module 9. Such sampled signals are obtained by the control module 7 controlling the Sensor 2, color interpolation module 3, circuits 4,5 and memory unit 6 and display unit 8. Further, if a user wishes to transfer images stored on the memory unit 6, then by suitable commands effected by the user input module 9, images can be loaded onto a removable memory inserted into the output port 10.

Figure 3:
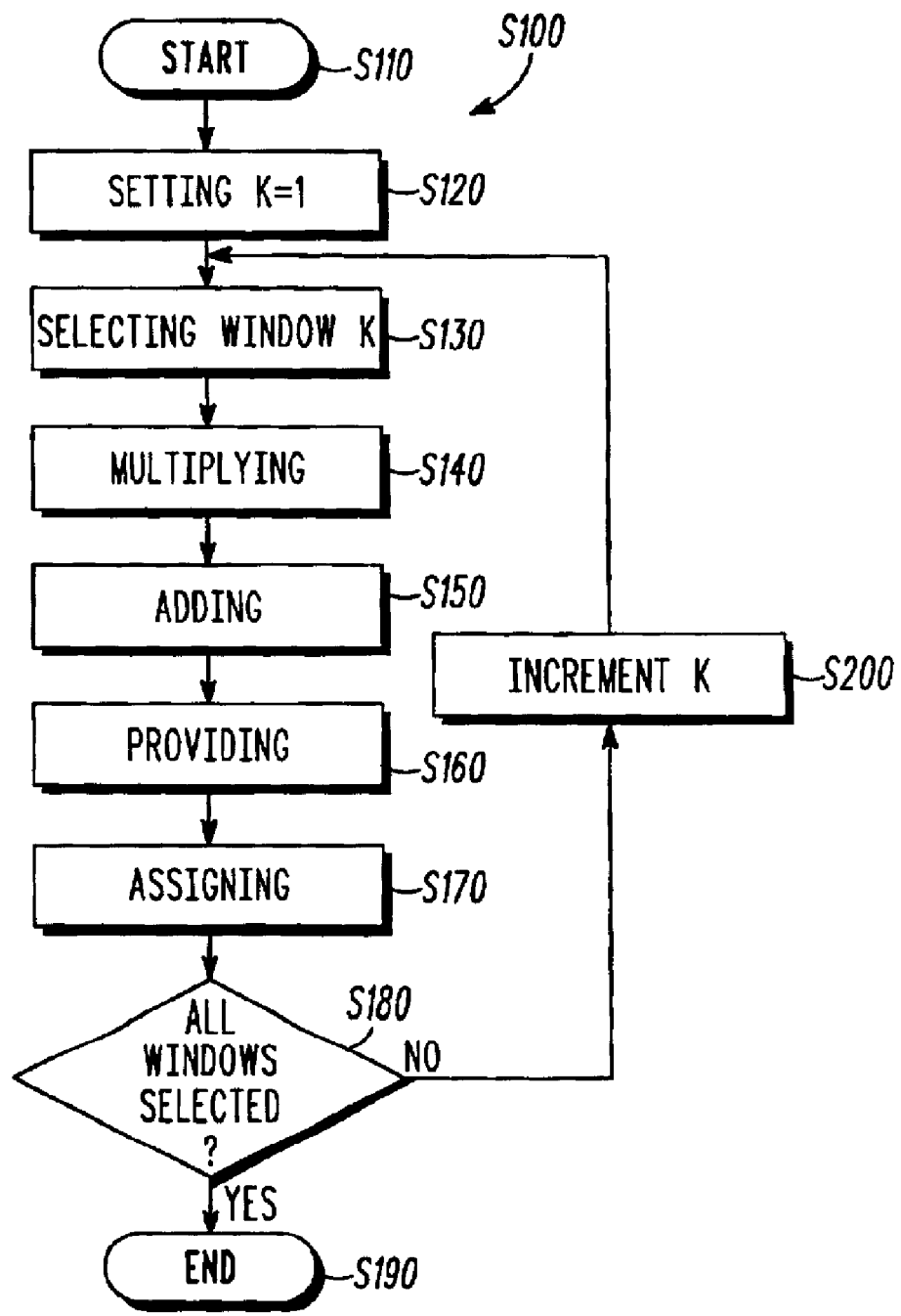
FIG. 3 is a flow diagram of a method for providing dynamic range compression on output channel data from pixel values generated by a sensor of the camera of FIG. 1.

Referring to FIG. 3 there is illustrated a method S100 for providing dynamic range compression on processed output channel data from the image sensor 2 comprising an array of sensor cells. The image sensor 2 provides an output channel of data in a Bayer Pattern PB that is processed by the color interpolation module 3, color correction circuit 4 and color space conversion circuit 21. In this embodiment, output channel data of processed pixel values $y_{pix}$ for the sensor cells of image sensor 2 associated with the luminance channel Y are processed by the method S100 in the dynamic range compression circuit 22. Upon control module 2 sending a start command the method S100 effects a start step S110 and then a setting step S120 that sets a counter K to 1. A selecting a window step 130 in the channel data is then effected in which part of the channel data for the luminance channel Y stored in circuit 22 is selected as a window. The window has an associated reference pixel value and a plurality of nearby pixel values, the reference pixel value originates from a processed output of a reference cell that is one of the sensor cells and the nearby pixel values originate from a processed output of sensor cells that are in close proximity to the reference cell. More specifically, the reference cell is a centrally located cell in an array of the sensor cells that provide the nearby pixel values.

The circuit 22 then effects a step S140 of multiplying each pixel value in the window by a respective weight value to provide weighted pixel values. This has the effect of Gaussian filtering the pixel values due to the weights W(x,y) being of a Gaussian form:

$$W(x,y) = C \exp[-(x^2+y^2)/2\sigma^2] \quad (1)$$

where C is a constant); $\sigma$ is a standard deviation; x and y are the indexes of the pixels.

A step S150 of adding the weighted pixel values to provide a convolution value F is then effected. In this embodiment the window represents a 3 by 3 array therefore there are eight nearby pixels in the window.

The circuit 22 then effects a step S160 of providing a dynamic range compression value DRCV for the window from the reference pixel value and the convolution value. In this regard, the dynamic range compression value is determined by dividing the reference pixel value by the convolution value as described in equation (2).

$$DRCV = \frac{i_{ref}}{A + W \otimes I} \quad (2)$$

where $i_{ref}$ is the reference pixel value; I is a matrix representing the processed pixel values $y_{pix}$ in the window identified by counter K for sensor cells associated with the luminance channel Y; W is a weight matrix representing strengths of connections for a corresponding cell in matrix I; and A is matrix containing constant decay values of the corresponding cell in matrix I; and $\otimes$ is a convolution function. The dividing of the reference pixel value by the convolution value has the effect of non-linear filtering the pixel values $y_{pix}$ in the window.

At a step S170 an assigning of the dynamic range compression value DRCV to a selected pixel location comprising part of the image that is stored in the memory unit 6. A test step S180 then determines if there are any more windows to be processed and if there are more windows in the channel data then the counter K is incremented at a step S200 and steps S130 to S180 are repeated for a new window indexed by counter K. Thus, every pixel location in the luminance color spectrum for the image is assigned a dynamic range compression value DRCV.

Figure 4:
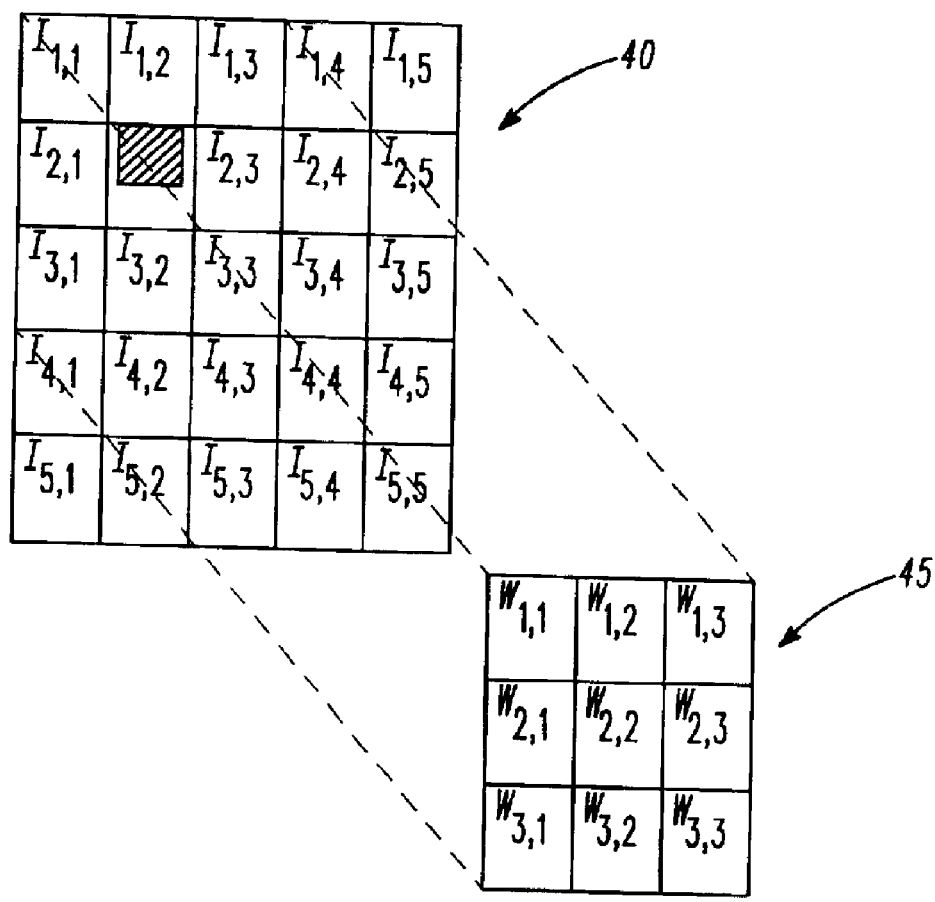
FIG. 4 is a visual representation of a window and corresponding weight values used in the method of FIG. 3.

In FIG. 4, a visual representation of a window in the channel data 40 and corresponding weight values 45 used in the method S100 is illustrated. The window represents a 3 by 3 array of pixel values $I_{1,1}$, $I_{1,2}$, $I_{1,3}$, $I_{2,1}$, $I_{2,2}$, $I_{2,3}$, $I_{3,1}$, $I_{3,2}$, $I_{3,3}$ whereby the reference pixel is $I_{2,2}$. The corresponding weight values 45 are in a weight matrix W with elements $W_{1,1}$, $W_{1,2}$, $W_{1,3}$, $W_{2,1}$, $W_{2,2}$, $W_{2,3}$, $W_{3,1}$, $W_{3,2}$, $W_{3,3}$. Thus using equation (2) the method S100 (and assigning all elements of matrix A to a value of 1), a dynamic range compression value DRCV for this window with reference pixel $I_{2,2}$ is calculated as follows:

$$\frac{I_{2,2}}{1 + I_{1,1}W_{1,1} + I_{1,2}W_{1,2} + I_{1,3}W_{1,3} + I_{2,1}W_{2,1} + I_{2,2}W_{2,2} + I_{2,3}W_{2,3} + I_{3,1}W_{3,1} + I_{3,2}W_{3,2} + I_{3,3}W_{3,3}}$$

Advantageously, the present invention compensates for changes in frequency characteristics acting in the same way visual systems behaves. It is well known in biological vision that changing frequency characteristics with mean luminance is important because the nature of the noise present in the input changes significantly with mean luminance. At low values of mean luminance there is a significant proportion of high frequency noise caused by random photon events. At higher mean luminance values the signal to noise ratio improves as the proportion of random photon events decreases, making detection of high frequency component far less error prone. This invention processes the output channel data by the circuit 22 effectively changing from an object detector for low light level pixeel values to a feature detector for bright light level pixel values. This is due to the change in frequency characteristics in visual cells, which act as low pass filters at low light levels and become bandpass filters as light intensity increases.

The detailed description provides preferred exemplary embodiments only, and is not intended to limit the scope, applicability, or configuration of the invention. Rather, the detailed description of the preferred exemplary embodiments provide those skilled in the art with an enabling description for implementing preferred exemplary embodiments of the invention. It should be understood that various changes may be made in the function and arrangement of elements without departing from the spirit and scope of the invention as set forth in the appended claims.

We claim:

1. According to one aspect of the invention there is provided a method for dynamic range compression of output channel data from an image sensor comprising an array of sensor cells, the method comprising the steps of:

selecting a window in the channel data, the window having a reference pixel value and a plurality of nearby pixel values, said reference pixel value originating from a reference cell that is one of the sensor cells and said nearby pixel values originating from said sensor cells that are in close proximity to said reference cell;

multiplying said pixel values in the window by a respective weight value to provide weighted pixel values;

adding said weighted pixel values to provide a convolution value;

providing a dynamic range compression value for said window from a selected one of said pixel values and said convolution value; and assigning the dynamic range compression value to a selected pixel location comprising part of an image.

2. A method for dynamic range compression as claimed in claim 1, wherein the step of providing is effected by dividing the said selected one of said pixel values by the convolution value to provide said dynamic range compression value.

3. A method for dynamic range compression as claimed in claim 2, wherein said selected one of said pixel values is said reference pixel value.

4. A method for dynamic range compression as claimed in claim 1, wherein the widow corresponds only to a chrominance channel.

5. A method for dynamic range compression as claimed in claim 1, wherein the steps are repeated so that the step of assigning thereby assigns a said dynamic range compression value to every pixel location providing a luminance color spectrum for said image.

6. A method for dynamic range compression as claimed in claim 1, wherein said reference cell may is a centrally located sensor cell in an array of said sensor cells providing said nearby pixel values.

7. A method for dynamic range compression as claimed in claim 1, wherein said step of multiplying is further characterised by the respective weight value having the effect of Gaussian filtering.

8. A method for dynamic range compression as claimed in claim 7, wherein the step of multiplying is further characterised by all said pixel vales in the window being multiplied by a said respective weight value.

9. A method for dynamic range compression as claimed in claim 1, wherein said dividing has the effect of non-linear filtering said pixels values in said window.

10. A method for dynamic range compression as claimed in claim 1, wherein the steps of adding, providing and assigning are effected by:

$$\frac{i_{ref}}{A + W \otimes I}$$

where $i_{ref}$ is the reference pixel value; I is a matrix representing the pixel values in the window for the luminance channel; W is a weight matrix representing strengths of connections for a corresponding sensor cell in the matrix I; and A is matrix containing decay values of the corresponding cell in matrix I; and $\otimes$ is a convolution function.

11. A digital camera comprising: an image sensor comprising an array of sensor cells; and a Channel processing circuit coupled to receive channel output data from the image sensor, wherein in use the Channel processing circuit selects a window in the channel data, the window having a reference pixel value and a plurality of nearby pixel values, said reference pixel value originating from a reference cell that is one of the sensor cells and said nearby pixel values originating from said sensor cells that are in close proximity to said reference cell; and thereafter assigns a dynamic range compression value to a selected pixel location comprising part of an image, wherein the Channel processing circuit determines the dynamic range compression value by: multiplying said pixel values in the window by a respective weight value to provide weighted pixel values; adding said weighted pixel values to provide a convolution value; and dividing a selected one of said pixel values by said convolution value.

12. A digital camera as claimed in claim 11, wherein said selected one of said pixel values is said reference pixel value.

13. A digital camera as claimed in claim 11, wherein the widow corresponds only to a chrominance channel.

14. A digital camera as claimed in claim 11, wherein said multiplying is further characterised by the respective weight value having the effect of Gaussian filtering.

15. A digital camera as claimed in claim 11, wherein said Channel processing circuit effects the function:

$$\frac{i_{ref}}{A + W \otimes I}$$

where $i_{ref}$ is the reference pixel value; I is a matrix representing the pixel values in the window for the luminance channel; W is a weight matrix representing strengths of connections for a corresponding sensor cell in the matrix I; and A is matrix containing decay values of the corresponding cell in matrix I; and $\otimes$ is a convolution function.

* * * * *